June 4, 1963

V. W. DAKIN 3,091,808

VACUUM FORMING DRUM

Filed Feb. 19, 1960

INVENTOR.
BY Vernon W. Dakin
R. P. Barnard
ATTORNEY

INVENTOR.
Vernon W. Dakin
BY
C. P. Barnard
ATTORNEY

June 4, 1963 V. W. DAKIN 3,091,808
VACUUM FORMING DRUM

Filed Feb. 19, 1960 4 Sheets-Sheet 4

INVENTOR.
BY Vernon W. Dakin
C. P. Barnard
ATTORNEY

United States Patent Office 3,091,808
Patented June 4, 1963

3,091,808
VACUUM FORMING DRUM
Vernon W. Dakin, New Lothrop, Mich., assignor to General Motors Corporation, Detroit, Mich., a corporation of Delaware
Filed Feb. 19, 1960, Ser. No. 9,738
7 Claims. (Cl. 18—19)

This invention relates to vacuum forming die apparatus and more particularly to a revolvable vacuum drum.

Recent advances in plastics technology have resulted in the development of many types of vacuum forming machines which provide apparatus for heating a strip of plastic material, positioning the plastic strip into a die mechanism, forming a part in the die mechanism, removing the formed part and severing the formed parts in the continuous strip. An example of this type of machine is shown in my copending application Serial No. 743,823, now Patent No. 2,982,067, "Packaging Machine and Method." Although such apparatus fulfilled the need for automatic machinery, it has been found desirable to provide vacuum forming die means that are interchangeably associated with the machine so that a plurality of vacuum forming dies of different shapes and sizes may be readily interchanged in the standard machine apparatus. In order to provide interchangeability of different size vacuum forming dies without costly losses of machine time during changeovers, the vacuum forming drum should have a minimum of connections with the automatic machiney and should be so mounted and associated that the apparatus can be easily handled during the replacement process.

It is, therefore, a principal object of this invention to provide vacuum forming die apparatus that is readily interchangeable with standard automatic equipment. Another object of this invention is to provide a vacuum forming die drum that has no mechanical link with automatic machinery with which it is associated. Another object of this invention is to provide a vacuum forming drum die that is detachably associated with automatic machinery. It is a further object of this invention to provide automatic machinery for vacuum forming articles in a continuous strip on interchangeable vacuum drum dies. It is a further object of this invention to provide a vacuum forming drum die that is freely rotatable relative to the automatic machinery and is driven by the rotative action of the material for the formed parts. It is an additional object of this invention to provide a freely rotatable vacuum forming drum die having forming mechanism that assists in maintaining the proper rotation of the vacuum forming die drum relative to the other parts of the machine. Another object of this invention is to provide valve mechanism to control the forming operation and integrated with a die drum.

The objects of this invention are accomplished by rearranging the positions of the work stations of automatic machinery for vacuum forming parts in a continuous strip of material to accommodate new and useful interchangeable vacuum forming die drums. The die drums are freely rotatable and supported by a portable fixture that is provided with rolling means for easy transportation. The automatic machinery is provided with a special housing and support platform to which the interchangeable, movable vacuum forming dies may be readily secured. The vacuum forming die drum is provided with two sources of rotative power comprising the driving action of the continuous sheet of material for the formed parts which is driven by a series of rolls and by the provision of pneumatically extendable center of mass changing means mounted on the periphery of the vacuum forming die drum. A control valve is integrally associated with the vacuum forming die drum to actuate the mechanism in timed relationship with the angular position of the drum.

Other objects and advantages of this invention will be more readily apparent by reference to the following detail description and the accompanying drawings wherein.

Figure 1:
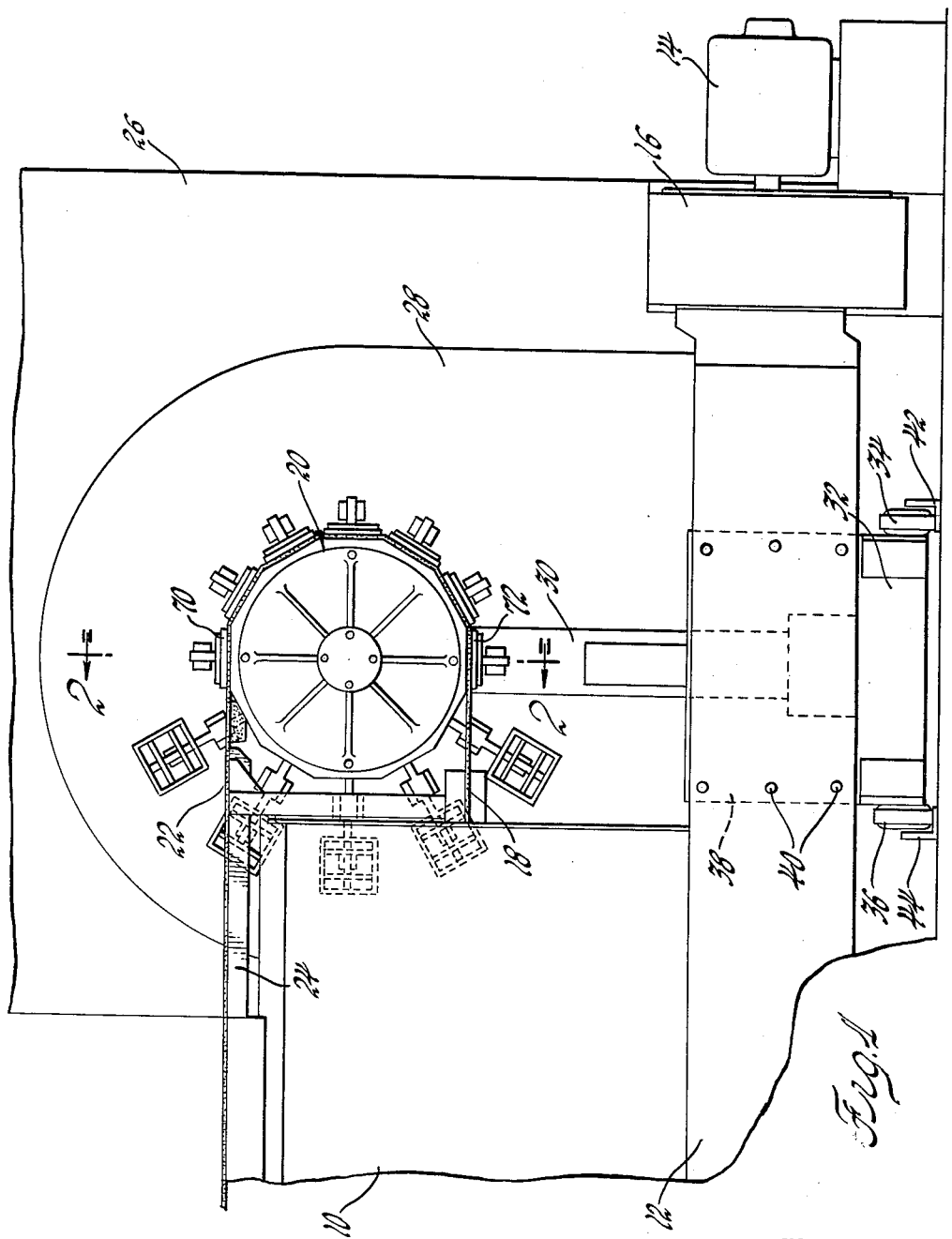
FIGURE 1 is a side elevational view of the preferred embodiment of my invention.

The machine partly illustrated in FIGURE 1 is of the type that uses a strip of thermoplastic materials such as cellulose, acetate, polyethylene, vinyl or other plastic materials which are adapted to be used in vacuum forming operations. The strip of material is advanced from a roll of the material by power actuated rollers through heating apparatus which prepares the strip for the vacuum forming process. The articles of manufacture are vacuum formed on adjacent portions of the strips and emerge from the vacuum forming apparatus in a continuous strip. The continuous strip of formed articles slides on conveyor rails to other stations where they are filled, sealed, separated and have other suitable operations performed. The entire machine is operated under time scheduling of the various stations so that a continuous packaging line is provided as disclosed in my copending application Serial No. 743,823, now Patent No. 2,982,067.

Referring now to FIGURE 1, the part of the automatic machine incorporating my invention is shown as comprising a frame 10 that houses suitable heating apparatus and film driving roller mechanism that is connected through suitable power transfer mechanism located in a tunnel 12 to an electric motor 14 through a transmission 16. A heated portion 18 of a plastic film strip is driven outwardly of the casing 10 around the vacuum forming die drum 20. The formed portion 22 of the plastic strip is delivered to a conveyor member 24 which carries the formed strip to other operating stations as disclosed in my copending application Serial No. 743,823. A housing 26 is provided to accommodate the vacuum forming die drum 20 and is provided with a door 28 to permit rapid change of different sized vacuum forming die drums. The die drums are rotatably mounted on a support column 30 that is carried on a support platform 32. A plurality of wheels 34, 36 or other roller means movably support the platform 32. One end of the platform is provided with a fastening plate 38 having a plurality of bolt holes 40 or other fastening means adapted to secure the plate 38 to cooperating fastening means formed on the back of the power transfer mechanism housing 12. Track members 42, 44 may be fixedly secured to the base of the apparatus and are adapted to retainingly accommodate the roller means 34, 36.

Figure 2:
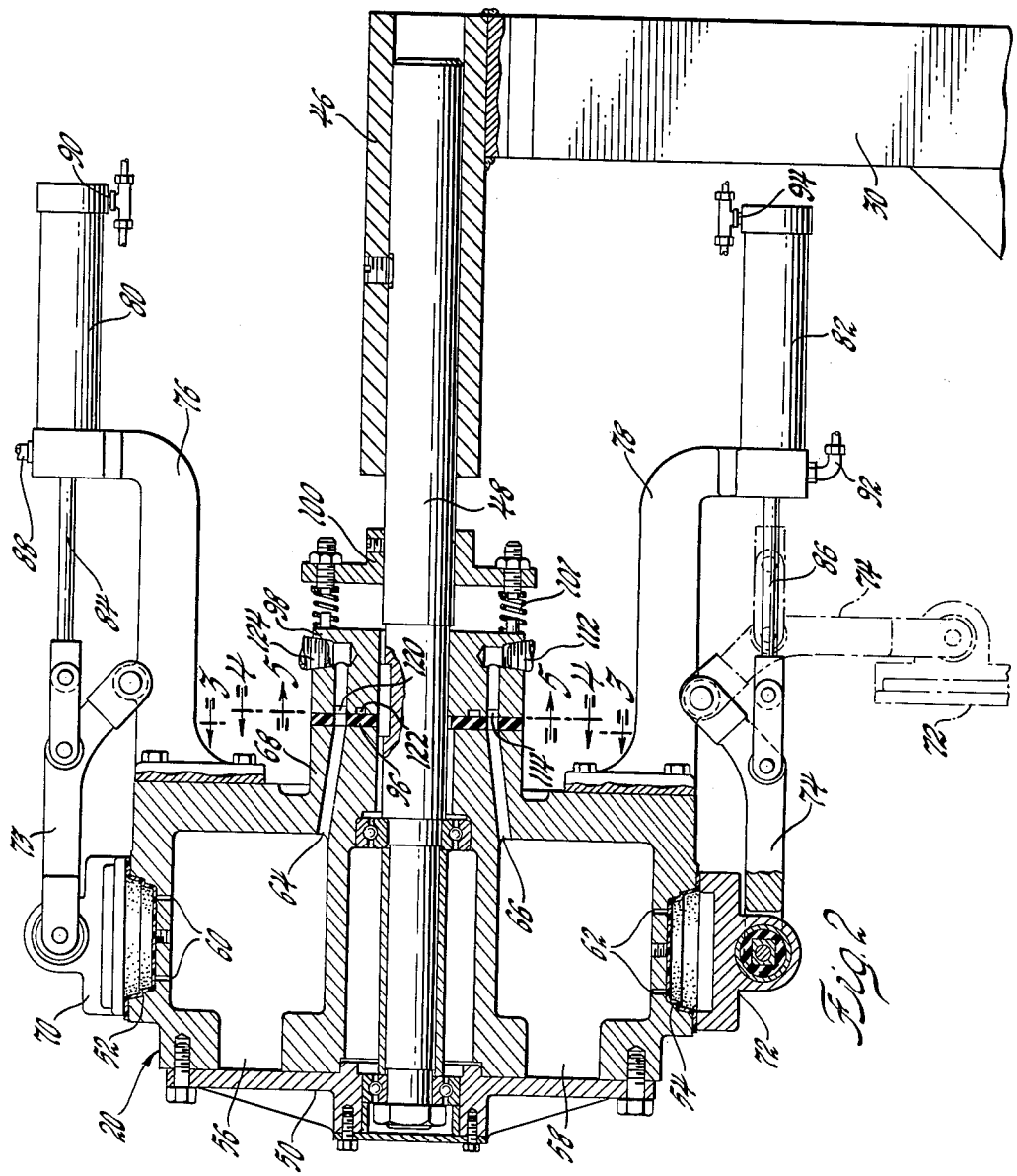
FIGURE 2 is a sectional view taken along the line 2—2 in FIGURE 1.

Referring now to FIGURE 2, a shaft support bushing 46 is transversely fixed to the support column 30 and accommodates a shaft 48. The vacuum forming drum die 20 is rotatably supported on the end of the shaft 48 by a cover plate 50 and comprises a plurality of forming cavities 52, 54 spaced about the periphery of the forming drum. Each of the forming cavities 52, 54 is connected to a vacuum chamber 56, 58 by suitable through holes 60, 62. The cover plate 50 is sealingly secured along one side of the vacuum chambers 56, 58. The opposite side of the vacuum chambers is connected to vacuum passages 64, 66 that extend axially outwardly through a boss portion 68. Each of the forming cavities around the periphery of the forming drum is provided with clamping plates 70, 72 that are pivotally connected to actuating links 73, 74 that are pivotally supported on support arms 76, 78 which are bolted to the side of the forming drum 20 and are rotatable therewith about the shaft 48. Each of the clamping frames 70, 72 is provided with fluid operated actuating mechanism comprising cylinders 80, 82 and piston operated connecting rods 84, 86. The fluid cylinders 80, 82 are provided with fluid passages 88, 90, 92, 94 at their ends in a conventional manner. Fluid control means are concentrically mounted on the shaft 48 adjacent the boss 68 and comprise a fluid transferring seal and wear plate 96, a fluid valve 98 and a sealing bias plate 100 that seats compression springs 101 interposed between the plate 100 and the valve 98.

Figure 3:
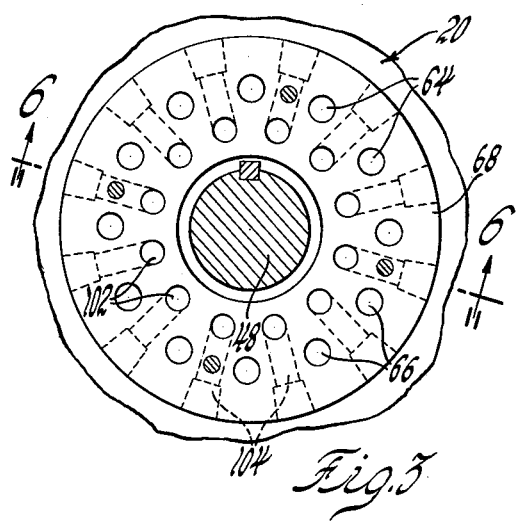
FIGURE 3 is a sectional view taken along the line 3—3 in FIGURE 2.
Figure 4:
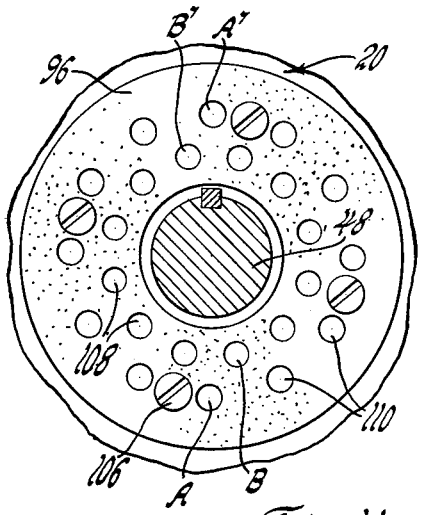
FIGURE 4 is a sectional view taken along the line 4—4 in the direction of the arrows as shown in FIGURE 2.

Referring now to FIGURE 3, the hub 68 is provided with vacuum passages 64, 66 for each of the vacuum chambers of each of the forming cavities, there being twelve forming cavities illustrated. In addition, the hub 68 is provided with a plurality of axially extending passages 102 that extend axially inwardly from the face of the boss 68 to transverse radially extending passages 104 that open about the periphery of the boss 68. One set of the communicating passages 102, 104 is provided for each of the vacuum forming chambers 52, 54 for a purpose to be hereinafter described. As shown in FIGURE 4, the seal and wear plate 96, which may be made of Micarta or other suitable material, is fastened to the boss 68 by a plurality of screw members 106 and is additionally provided with a plurality of through holes 108 that are aligned with the axially extending passages 102 and a plurality of through holes 110 that are aligned with the vacuum passages 64, 66. The wear plate 96 rotates with the boss 68 and the drum 20 about the shaft 48.

Figure 5:
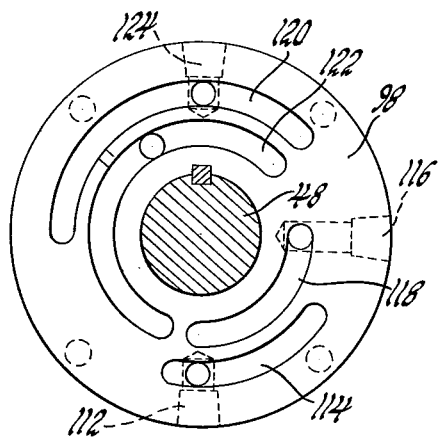
FIGURE 5 is a sectional view taken along the line 5—5 in the direction of the arrows as shown in FIGURE 2.

Referring now to FIGURE 5, the cylindrical valve 98 comprises a vacuum inlet 112 that communicates with an arcuate passage 114 that is radially aligned with the vacuum passages 64, 66. A high pressure inlet 116 communicates with an arcuate passage 118 that is radially aligned with the axially extending passages 102. An arcuate passage 120 is also radially aligned with the vacuum passages 64, 66 and an arcuate passage 122 is radially aligned with the axially extending passages 102. The arcuate passages 120, 122 are suitably connected with an exhaust passage 124 extending radially outwardly through the periphery of the valve. The valve member 98 is non-rotatably keyed to the shaft 48.

Figure 6:
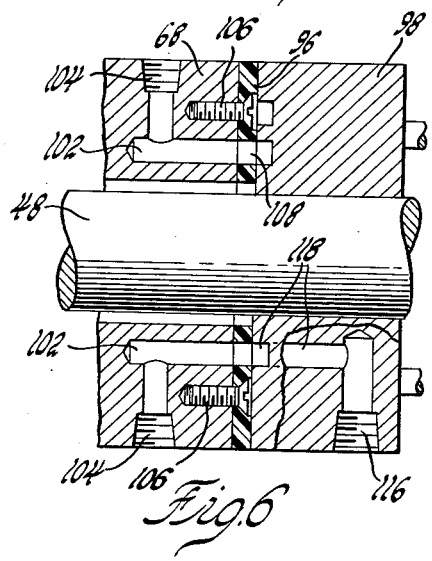
FIGURE 6 is a sectional view taken along the line 6—6 in the direction of the arrows as shown in FIGURE 3.

As shown in FIGURE 6, in the assembled position the high pressure inlet 116 is connected to the radially extending outlet 104 through the arcuate passage 118 in the valve 98, the holes 108 in the wear plate 96 and the axially extending passages 102 in the hub 68.

Figure 7:
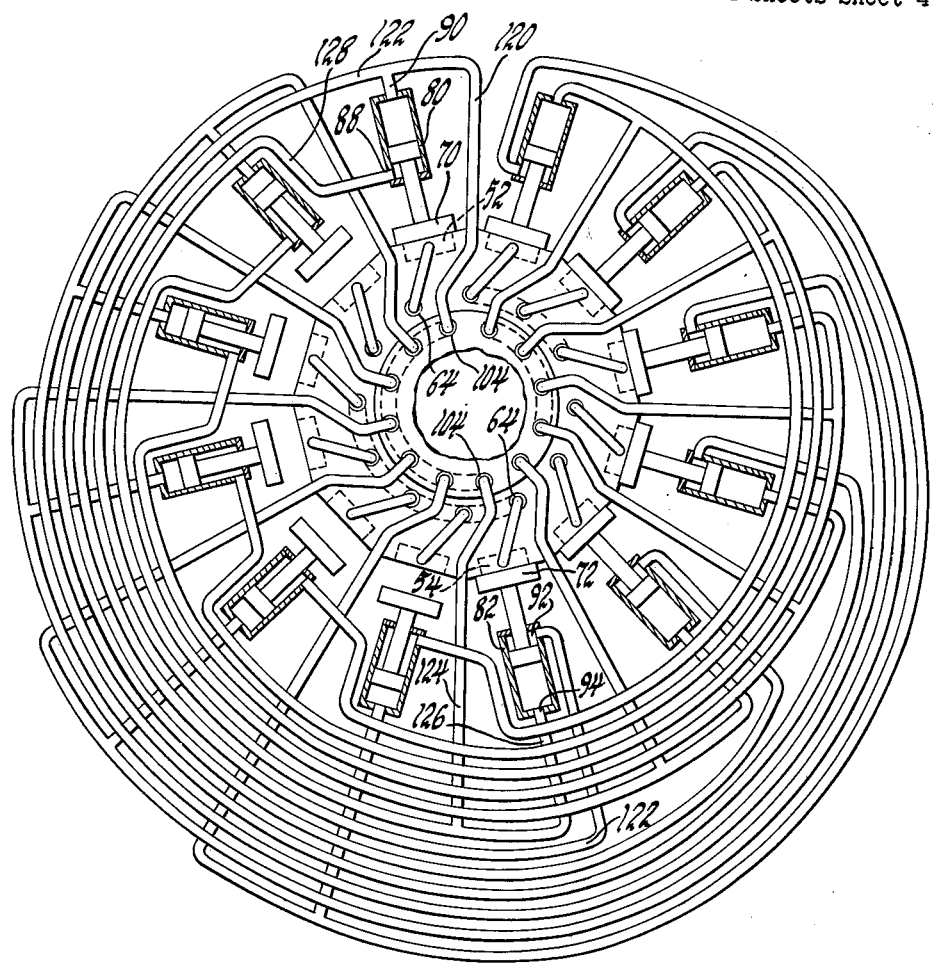
FIGURE 7 is a diagrammatic illustration of the fluid actuated control apparatus of my invention.

Referring now to FIGURE 7, the fluid coupling apparatus extending between the high pressure outlet 104 and the cylinders 80, 82 is shown schematically and comprises a hose connection extending through suitable coupling means from each of the outlets 104 to opposite ends of oppositely disposed cylinders. The cylinders 80, 82, shown in FIGURE 2 and radially spaced 180 degrees, are schematically illustrated in FIGURE 7 and their fluid couplings comprise a conduit 120 that connects the high pressure outlet 104 to the inlet 90 of the cylinder 80. A branch 122 of the conduit 120 extends 180 degrees around the forming drum to connect with the inlet 92 of the cylinder 82. Likewise, a conduit 124 extends from one of the high pressure outlets 104 to the inlet 94 of the cylinder 82 through a branch 126 and to the inlet 88 of the cylinder 80 through a branch 128. Each of the oppositely disposed cylinders is provided with similar fluid actuating connections so that the condition induced within a particular cylinder is correspondingly induced on the opposite side of the opposite cylinder member.

In operation, a rotatable forming drum having suitably sized forming pockets is wheeled into the housing 26 by the machine operator onto the tracks 42, 44 and fastened by the plate 38 to a suitable portion of the machine. Then a strip of the plastic material is threaded through the rolls and around the forming drum to the conveyor rails 24. In operation the plastic film will be heated and drawn around the forming drum die to discharge formed parts onto the conveyor rails 24. It will be noted that the drum freely rotates on its support shaft 48 and has no driving connection other than the effect of the plastic film being drawn therearound. However, to eliminate any undesirable effects caused by the strain on the plastic film due to the inertia of the rotation drum 20, a mass unbalance is created in the direction of rotation of the drum by the fluid operated clamping frames. Thus, as shown in FIGURE 1, the drum 20 is rotating counterclockwise with the frame members on the upwardly moving side in the closed position and the frame members on the downwardly moving side in their extended position to create a mass unbalance tending to keep the forming drum rotating in the counterclockwise direction.

During operation of the drum, the different cycles of operation are controlled by the position of the hub 68 and wear plate 96 relative to the valve member 98 as the hub 68 and the wear plate 96 rotate relative to the valve member 98. In order to describe the operation of the fluid mechanisms, reference is made to FIGURE 4 and the oppositely disposed passages, A, B and A', B' which are fluid passages for opposite forming cavities. As the ports A, B are rotated in the direction of the arrows as shown in FIGURE 5, the vacuum port A comes into communication with the arcuate vacuum passage 114 and the pressure port B comes into communication with the arcuate high pressure passage 118. Thus, high pressure is admitted through the port B and its corresponding axially extending passage 102, outlet port 104, and hose to the frame closing side of the fluid motor 82 to actuate the linkage 74 and clamp the frame 72 onto the periphery of the rotating drum 20. Simultaneously, high pressure travels from a branch of the high pressure hose to the disengaging side of the fluid motor 80 to actuate the linkage 73 and disengage the clamp 70 from the periphery of the rotating drum 20. At this time the ports A', B' are in communication with the arcuate exhaust passages 120, 122 which provide for dissipation of the vacuum of the opposite forming cavity 56 and provides for high pressure exhaust from the ports 90 and 92, of the cylinders 80 and 82, respectively. As the drum rotates, the ports A', B' will gradually be revolved into engagement with the arcuate high pressure port 118 and the arcuate vacuum port 114 to reverse the aforedescribed operation.

While I have shown only the preferred embodiment of my invention, it should be understood that various changes in the details of construction and arrangement of parts may be made within the scope of the appended claims without departing from the spirit of the invention.

I claim:
1. Apparatus of the character described comprising a horizontally rotatable forming drum, forming means spaced about the periphery of said forming drum, a portion of said forming means movable from a position closely adjacent the periphery of said forming drum to a position radially outwardly extended from the periphery of said forming drum, power actuated mechanism operatively associated with said portion of said forming means for positioning actuation thereof, a power source connected to said power actuated mechanism, and power supply control means associated with said forming drum and responsive to the rotative position thereof to cause said portion of said forming means to be actuated to said position closely adjacent the periphery of said forming drum during upward rotative movement of said forming drum and to be actuated to said position radially outwardly extended from the periphery of said forming drum during downward rotative movement of said forming drum to create a rotation sustaining force.

2. A freely rotating vacuum forming drum adapted to receive on the peripheral surfaces thereof a moving plastic strip, said strip imparting rotative movement to said drum, said drum comprising a plurality of forming cavities peripherally spaced thereon, individual vacuum chambers formed within said drum for each of said forming cavities, vacuum passages connecting said forming cavities and said vacuum chambers, a shaft member freely rotatably supporting said vacuum forming drum, vacuum ports leading from each of said vacuum chambers to an exterior surface on the periphery of said drum, fluid passages leading from said exterior surface through a portion of said drum to another surface of said drum, clamping means associated with each of said forming cavities and pivotally supported on said drum, fluid operable control means for individually actuating each of said clamping means to and from clamping engagement about said cavities, a valve member fixedly supported relative to said exterior surface, a vacuum passage in said valve aligned with and connected to said vacuum passages in said drum at said exterior surface, a fluid passage in said valve aligned with and connected to said fluid passages in said drum at said exterior surface, a vacuum source connected to said vacuum passage and a fluid pressure source connected to said fluid passage in said valve, tubing members interconnecting said fluid passages in said drum and said fluid operable control means, said vacuum passage in said valve being spaced and positioned relative to said drum to communicate with a variable plurality of said vacuum passages in said drum to supply a vacuum to a variable plurality of said forming cavities, and said fluid passages in said valve being spaced and positioned to communicate with a variable plurality of said fluid passages in said drum to position a variable plurality of said clamping means, said clamping means actuated to a position of engagement with said forming cavities during upward rotative movement of said forming drum and to be actuated to a radially outwardly extended position during downward rotating movement of said drum whereby said drum is rotated in synchronism with said plastic strip.

3. A continuous packaging machine for forming successive articles in a plastic strip and having forming apparatus comprising a freely rotatable forming drum, a plurality of forming cavities peripherally spaced on said forming drum, drive means to feed said plastic strip onto the periphery of said drum in alignment with said forming cavities and to cause said plastic strip to assist in the rotation of said forming drum, forming means associated with said forming cavities to form said articles, and additional drive means cooperating with said plastic strip drive means for rotating said forming drum in the form of power actuated mechanisms, said power actuated mechanisms actuated to a position of engagement with said forming cavities during upward rotative movement of said forming drum and to be actuated to a radially outwardly extended position during downward rotative movement of said drum whereby said drum is rotated in synchronism with said plastic strip.

4. Vacuum forming apparatus comprising a horizontally rotatable forming drum, forming means spaced about the periphery of said forming drum, vacuum means associated with said forming means, clamping means pivotally fixed to said forming drum and movable from a position of engagement with said forming means to a position radially outwardly extended from the periphery of said forming drum, power actuated mechanism operatively associated with said clamping means for positioning actuation thereof, and power supply control means associated with said forming drum and responsive to the rotative position thereof to cause said clamping means to be actuated to said position of engagement with said forming means during upward rotative movement of said forming drum and to be actuated to the radially outwardly extended position during downward rotative movement of said drum to create a rotation sustaining force.

5. Apparatus of the character described for forming articles in a plastic strip having a removable forming drum assembly, said drum assembly comprising a horizontally disposed shaft, a freely rotating forming drum mounted for rotation on said shaft, article forming means spaced about the periphery of said forming drum for imparting a pre-determined shape to selected portions of said plastic strip, independent drive means for feeding said plastic strip onto the periphery of said forming drum and into engagement with said article forming means, said plastic strip imparting rotative movement from said independent drive means to said drum, dual position clamping means assembled and rotative with said forming drum for clamping a portion of said plastic strip to the periphery of said drum in one position during upward rotative movement of the drum and for imparting a rotational force to said drum in a second radially outwardly extended position during downward rotative movement of the drum thereby assisting said plastic strip drive means, valve means controlled by said drum rotation for activating said clamping means successively and cyclically from said first position to said second position, fluid activating means successively in communication with said clamping means and regulated by said valve means for positioning said clamping means whereby said forming drum is rotated in synchronism with said driven plastic strip.

6. The apparatus as defined in claim 5 having, in addition, a vacuum source controlled by said valve means, said article forming means having cavities formed therein successively covered by said plastic strip, said vacuum source successively communicating with said cavities simultaneous with the covering thereof, whereby said vacuum source exhausts fluid from said cavities creating a vacuum therein thus allowing atmospheric pressure to deform said plastic strip into said cavities.

7. In a packaging machine for forming articles in a thermoplastic strip, a differential pressure actuated forming device comprising a freely rotatable drum, a plurality of circumferentially spaced depressions formed on the outer periphery of said drum, differential pressure creating means connected to said depressions from within said drum, independent drive means for feeding a thermally softened thermoplastic strip onto the outer periphery of said drum, said strip imparting rotative movement from said independent drive means to said drum, dual position clamping means attached to said drum and being engageable about said depressions in one position of drum rotation and being radially outwardly positionable away from said depressions in another position of drum rotation, said radially outwardly position providing a rotational assist for said independent drive means in rotating said drum, fluid motor means for actuating each of said clamping means, a high pressure fluid source connectable with said fluid motor means, a vacuum source connectable with said differential pressure creating means, and a negative and positive pressure control valve actuated by drum rotation and controlling operative connection between said differential pressure creating means and said vacuum source and said fluid motor means and said high pressure source.

References Cited in the file of this patent
UNITED STATES PATENTS
2,117,400    Cobb _____ May 17, 1938
(Other references on following page)

UNITED STATES PATENTS

| | | |
|---|---|---|
| 2,312,049 | Pfeiffer | Feb. 23, 1943 |
| 2,623,953 | Fodor | Dec. 30, 1952 |
| 2,663,130 | Donofrio | Dec. 22, 1953 |
| 2,750,625 | Colombo | June 19, 1956 |
| 2,767,435 | Alles | Oct. 23, 1956 |
| 2,864,176 | Backlert et al. | Dec. 16, 1958 |
| 2,888,787 | Cloud | June 2, 1959 |
| 2,902,718 | Martelli et al. | Sept. 8, 1959 |
| 2,934,867 | Vogt | May 3, 1960 |
| 2,980,960 | Croop | Apr. 25, 1961 |

OTHER REFERENCES

Scientific American, May 4, 1901, page 276.